(12) United States Patent
Kim et al.

(10) Patent No.: US 11,910,126 B2
(45) Date of Patent: Feb. 20, 2024

(54) DISPLAY APPARATUS

(71) Applicants: SAMSUNG ELECTRONICS CO., LTD., Suwon-si (KR); FOUNDATION FOR RESEARCH AND BUSINESS, SEOUL NATIONAL UNIVERSITY OF SCIENCE AND TECHNOLOGY, Seoul (KR)

(72) Inventors: Gyo Nyun Kim, Ansan-si (KR); Chang Won Jung, Namyangju-si (KR); Jung-Jin Kim, Seoul (KR); Dong Hoon Lee, Suwon-si (KR)

(73) Assignees: SAMSUNG ELECTRONICS CO., LTD., Suwon-si (KR); FOUNDATION FOR RESEARCH AND BUSINESS, SEOUL NATIONAL UNIVERSITY OF SCIENCE AND TECHNOLOGY, Seoul (KR)

(*) Notice: Subject to any disclaimer, the term of this patent is extended or adjusted under 35 U.S.C. 154(b) by 732 days.

(21) Appl. No.: 17/040,145

(22) PCT Filed: Oct. 2, 2018

(86) PCT No.: PCT/KR2018/011711
§ 371 (c)(1),
(2) Date: Sep. 22, 2020

(87) PCT Pub. No.: WO2019/190011
PCT Pub. Date: Oct. 3, 2019

(65) Prior Publication Data
US 2021/0120203 A1 Apr. 22, 2021

(30) Foreign Application Priority Data
Mar. 28, 2018 (KR) .................... 10-2018-0035774

(51) Int. Cl.
*H04N 5/44* (2011.01)
*H01Q 1/24* (2006.01)
(Continued)

(52) U.S. Cl.
CPC ............... *H04N 5/44* (2013.01); *H01Q 1/24* (2013.01); *H01Q 1/48* (2013.01); *H01Q 23/00* (2013.01); *H04N 5/655* (2013.01)

(58) Field of Classification Search
CPC .......... H04N 5/44; H04N 5/655; H04N 5/64; H01Q 1/24; H01Q 1/243; H01Q 1/48;
(Continued)

(56) References Cited

U.S. PATENT DOCUMENTS

2008/0305749 A1* 12/2008 Ben-Bassat ............. H04B 1/18
343/745
2009/0231212 A1 9/2009 Hardacker et al.
(Continued)

FOREIGN PATENT DOCUMENTS

KR 10-2010-0022462 A 3/2010
KR 10-2011-0086077 A 7/2011
(Continued)

OTHER PUBLICATIONS

Korean Office Action dated Jul. 11, 2022 issued by the Korean Patent Office in counterpart Application No. 10-2018-0035774.
(Continued)

*Primary Examiner* — Yogeshkumar Patel
(74) *Attorney, Agent, or Firm* — Sughrue Mion, PLLC

(57) ABSTRACT

The present disclosure relates to a display apparatus including a display panel, a bezel surface formed on a boundary of the display panel, and an antenna located on the bezel surface, wherein the antenna includes an antenna body extending in a horizontal direction to the bezel surface, an extension body provided on one side or opposite sides of the antenna body, and a frequency variable device configured to selectively electrically connect the antenna body and the extension body.

12 Claims, 10 Drawing Sheets

(51) Int. Cl.
*H01Q 1/48* (2006.01)
*H01Q 23/00* (2006.01)
*H04N 5/655* (2006.01)

(58) Field of Classification Search
CPC .......... H01Q 23/00; H01Q 5/321; H01Q 7/00; H01Q 1/22; H01Q 1/46; H01Q 1/52; H01Q 21/30; H01Q 9/00; H01Q 9/26; H04B 1/18
See application file for complete search history.

(56) References Cited

U.S. PATENT DOCUMENTS

2010/0125878 A1* 5/2010 Jing ................. H04N 21/43637
348/739
2016/0164168 A1* 6/2016 Choi ........................ H01Q 9/26
343/702

FOREIGN PATENT DOCUMENTS

| KR | 10-1055555 B1 | 8/2011 |
| KR | 10-1122785 B1 | 3/2012 |
| KR | 10-1250652 B1 | 4/2013 |
| KR | 10-2016-0067541 A | 6/2016 |
| KR | 10-1782950 B1 | 9/2017 |

OTHER PUBLICATIONS

International Search Report dated Mar. 4, 2019 (PCT/ISA/210) issued by the International Searching Authority for International Application No. PCT/KR2018/011711.

* cited by examiner

DISPLAY APPARATUS

TECHNICAL FIELD

The present disclosure relates to a display apparatus, and more particularly, to a display apparatus including an antenna.

BACKGROUND ART

In general, a display apparatus is a type of output device that visually displays acquired or stored image information to a user, and is used in various fields such as a home and a business.

Recently, display panels displaying content in a display apparatus are having high resolution and becoming large in size. In addition, in a display apparatus, the thickness of a case including a top chassis and a bottom chassis covering the display panel is also getting thinner. That is, a display apparatus is designed to make the thickness of a bezel thin to increase image immersion of the user.

Recently, a digital television (TV) service using a wired or wireless communication network has become common. The digital TV service may provide various services that may not be provided in a conventional analog broadcasting service.

An antenna for receiving a signal is required in order to receive the digital TV service. As display apparatuses are getting slim, the location where an antenna is built into a display apparatus is very limited. Therefore, an external antenna is usually used or a separate external tuner is used.

DISCLOSURE

Technical Problem

The present disclosure is directed to providing a display apparatus capable of receiving a broadcast band signal having broadband characteristics without a separate external device.

The present disclosure is directed to providing a display apparatus a display apparatus including an antenna capable of receiving a broadcast band signal having broadband characteristics without a separate external device.

The present disclosure is directed to providing a display apparatus with an improved design.

The present disclosure is directed to providing a display apparatus with improved convenience of use.

The present disclosure is directed to providing a display apparatus capable of reducing a manufacturing cost.

Technical Solution

One aspect of the present disclosure provides a display apparatus including a display panel, a bezel surface formed on a boundary of the display panel, and an antenna located on the bezel surface, wherein the antenna includes an antenna body extending in a horizontal direction to the bezel surface, an extension body provided on one side or opposite sides of the antenna body, and a frequency variable device configured to selectively electrically connect the antenna body and the extension body.

The frequency variable device may include a pin diode configured to electrically connect the antenna body and the extension body as power is supplied.

The antenna may be configured to operate at a first frequency when power supplied to the pin diode is cut off, and the antenna may be configured to operate at a second frequency lower than the first frequency when power is supplied to the pin diode.

The frequency variable device may include a varactor diode configured to adjust the degree of electrical connection between the antenna body and the extension body.

An operating frequency of the antenna may be configured to gradually increase as power supplied to the varactor diode increases.

The display apparatus may further include a bottom chassis configured to cover the rear of the display panel, wherein the antenna may include a power supply portion extending from one portion of the antenna body, and a ground portion extending from the other portion of the antenna body and connected to the bottom chassis.

The bottom chassis may include metal.

The antenna body may include a first body extending in a first direction along the bezel surface, a second body extending along the bezel surface in a second direction opposite to the first direction, and a connection body connecting the first body and the second body.

The connection body may include a power supply portion to which current is applied, and the antenna body may include a first ground portion extending from the first body and a second ground portion extending from the second body.

The antenna body may be configured to have a first resonant frequency formed by a first current flowing in the first direction along the first body and a second current flowing in the second direction along the second body, and a second resonant frequency formed by a third current sequentially flowing through the first body, the connection body, and the second body, wherein the second resonant frequency is different from the first resonant frequency.

A width of the connection body may be smaller than a width of the first body or the second body.

The antenna may include an inductor disposed on the extension body.

The antenna may be formed on at least one of an upper surface, a left surface, and a right surface of the bezel surface.

The antenna body may be disposed on the same surface as the bezel surface.

Another aspect of the present disclosure provides a display apparatus including a display panel, a bezel surface formed on a boundary of the display panel, bottom chassis configured to cover the rear of the display panel, and an antenna located on an upper surface of the bezel surface and having a portion connected to the bottom chassis, wherein the antenna includes an antenna body in contact with the upper surface of the bezel surface and provided in a planar shape to extend in the same direction as the upper surface of the bezel surface, an extension body provided on opposite sides of the antenna body, and a frequency variable device configured to selectively electrically connect the antenna body and the extension body.

The frequency variable device may include a pin diode or a varactor diode.

When the frequency variable device includes the pin diode, the pin diode may be configured to decrease an operating frequency of the antenna as power is supplied.

When the frequency variable device includes the varactor diode, the varactor diode may be configured to increase an operating frequency of the antenna as the amount of power supplied increases.

The antenna may include a power supply portion extending from one portion of the antenna body, and a ground portion extending from the other portion of the antenna body and connected to the bottom chassis.

Another aspect of the present disclosure provides a display apparatus including a display panel, a bezel surface formed on a boundary of the display panel, and an antenna located on the bezel surface and configured to have a plurality of resonant frequencies, wherein the antenna includes a frequency variable device configured to change the resonant frequencies.

Advantageous Effects

In a display apparatus according to the present disclosure, an antenna capable of receiving a broadcast band signal having a broadband characteristic is integrally provided on one side of a bezel of the display apparatus, so that a signal can be received without a separate external device.

A display apparatus according to the present disclosure includes an antenna having both a characteristic of a dipole antenna and a characteristic of a loop antenna and capable of selectively increasing a length by a frequency variable device, so that a signal of a wider band width can be received.

In a display apparatus according to the present disclosure, an antenna is provided integrally on the bezel, so that the design thereof can be improved.

A display apparatus according to the present disclosure does not require a separate external device for receiving a broadcast band signal having a broadband characteristic, so that convenience of use can be improved.

In a display apparatus according to the present disclosure, an antenna having a relatively simple configuration is provided integrally on the bezel, instead of a separate external device for receiving a broadcast band signal having a broadband characteristic, so that a manufacturing cost can be reduced.

MODE OF THE DISCLOSURE

Like reference numbers or signs in the various drawings of the application represent parts or components that perform substantially the same functions. This specification does not describe all elements of the embodiments, and the general contents in the technical field to which the present disclosure belong or the overlapping contents between the embodiments are omitted. The terms 'portion,' 'module,' 'member,' and 'block' used in the specification may be implemented by software or hardware, and according to embodiments, a plurality of 'portions', 'modules', 'members', and 'blocks' may be implemented as one component, or one 'portion,' 'module,' 'member,' and 'block' may include a plurality of components.

Throughout the specification, when a portion is described as being "connected" to another portion, this includes the case of being indirectly connected as well as being connected directly, and the indirect connection includes connecting through a wireless communication network.

When a portion is described as "comprising" a component, this means that other components may be further included rather than excluding other components unless otherwise specified.

Throughout the specification, when a member is described as being positioned "above" another member, this includes not only the case where one member is in contact with another member, but also the case where another member exists between the two members.

The terms first, second, etc. are used to distinguish one component from other components, and the component is not limited by these terms.

The singular expressions herein may include plural expressions, unless the context clearly dictates otherwise.

In each step, the identification number is used for convenience of description, and the identification number does not describe the order of each step. Each step may be performed differently from the specified order, unless a specific order is explicitly described in the context.

Hereinafter, principles and embodiments of the present disclosure will be described with reference to the accompanying drawings.

Figure 1:
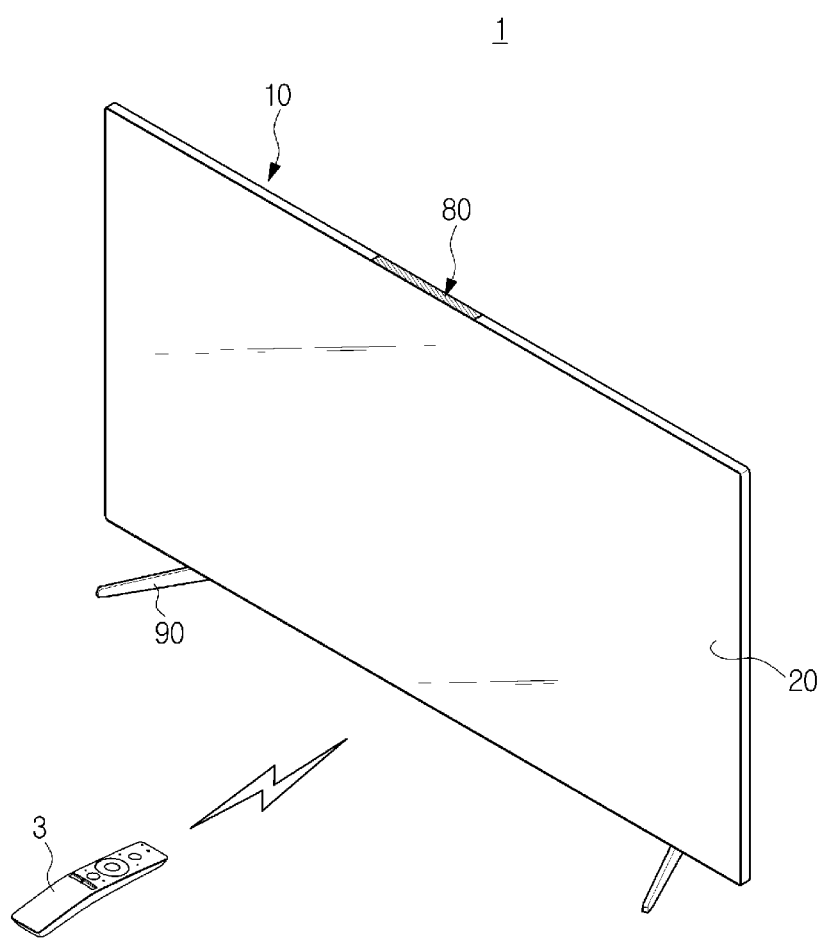
FIG. 1 illustrates an outer appearance of a display apparatus according to an embodiment of the present disclosure.

FIG. 1 illustrates an outer appearance of a display apparatus according to an embodiment of the present disclosure.

Figure 2:
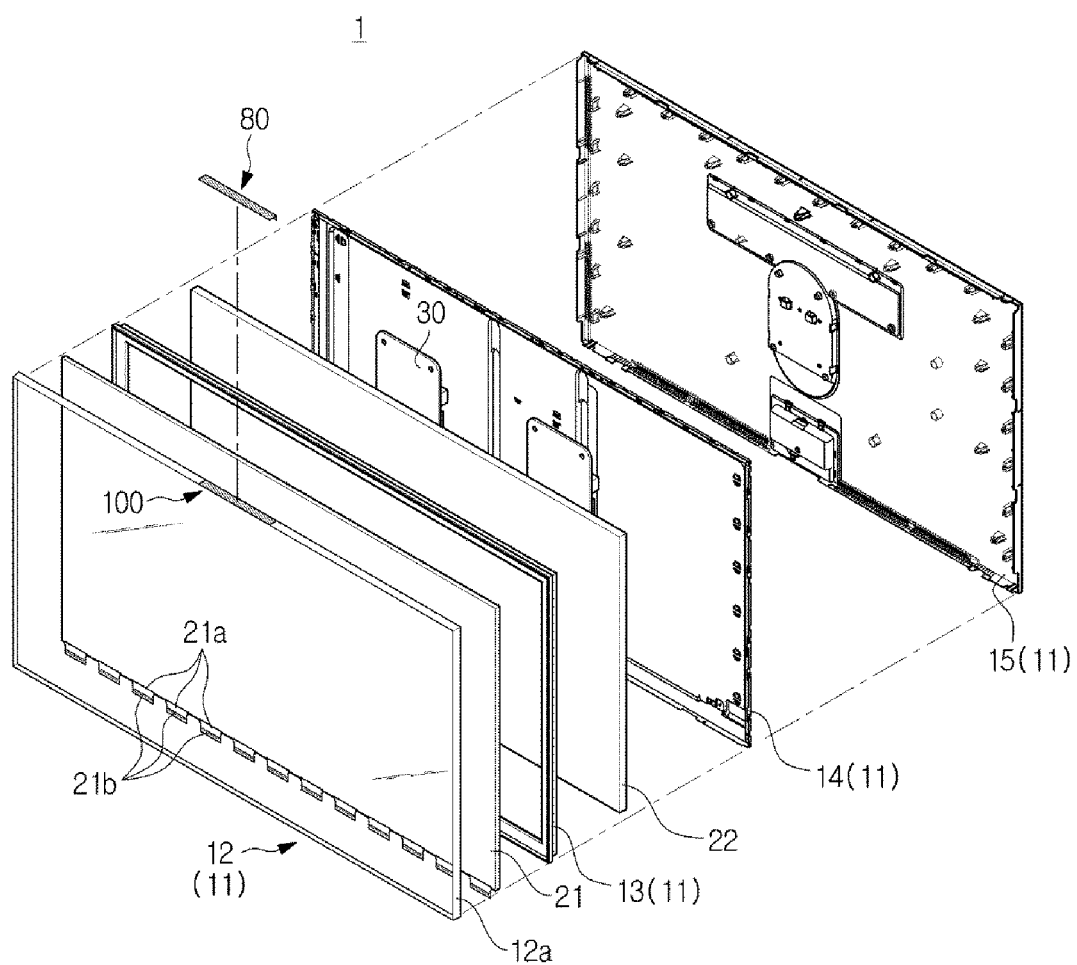
FIG. 2 is an exploded view of the display apparatus illustrated in FIG. 1.

FIG. 2 is an exploded view of the display apparatus illustrated in FIG. 1.

A display apparatus 1 is a device capable of processing an image signal received from the outside and visually displaying the processed image. Hereinafter, the case where the display apparatus 1 is a television (TV) is illustrated, but is not limited thereto. For example, the display apparatus 1 may be implemented in various forms such as a monitor, a portable multimedia device, a portable communication device, and a portable computing device, and when the display apparatus 1 is a device that visually displays an image, a form thereof is not limited.

Also, the display apparatus 1 may be a large format display (LFD) installed outdoors, such as a roof of a building and a bus stop. The outdoors are not necessarily limited to the outside, and the display apparatus 1 according to an embodiment of the present disclosure may be installed in a place where a large number of people may enter or exit even in an indoor environment, such as a subway station, a shopping mall, a movie theater, a company, a shop, and the like.

The display apparatus 1 may receive a video signal and an audio signal from various content sources and output video and audio corresponding to the video signal and the audio signal. For example, the display apparatus 1 may receive content from a content playback device, or receive content from a content providing server of a content provider.

As illustrated in FIG. 1, the display apparatus 1 may include a main body 10, a screen 20 displaying an image, a support 90 provided below the main body 10 to support the main body 10, and an input device 3 transmitting a signal to the display apparatus 1.

The main body 10 forms an outer shape of the display apparatus 1, and components necessary for the display apparatus 1 to display an image may be provided inside the main body 10. FIG. 1 illustrates that the main body is formed in a flat plate shape, but the shape of the main body is not limited to that illustrated in FIG. 1. For example, the main body may have a shape in which both right and left ends protrude forward and the center thereof is concave.

The screen 20 is formed on a front surface of the main body 10, and an image that is visual information may be displayed on the screen 20. For example, a still image or a video may be displayed on the screen 20, and a 2D flat image or a 3D stereoscopic image may be displayed.

A plurality of pixels is formed on the screen 20, and an image displayed on the screen 20 may be formed by a combination of light emitted from the plurality of pixels. For example, one image may be formed on the screen 20 by combining light emitted from a plurality of pixels like a mosaic.

Each of the plurality of pixels may emit light of various brightness and various colors.

In order to emit light of various levels of brightness, each of the plurality of pixels may include a configuration (e.g., an organic light emitting diode) capable of directly emitting light, or may include a configuration (e.g., a display panel) capable of transmitting or blocking light emitted by the backlight unit or the like.

In order to emit light of various colors, each of the plurality of pixels may include subpixels.

The subpixels may include a red subpixel capable of emitting red light, a green subpixel capable of emitting green light, and a blue subpixel capable of emitting blue light. For example, red light may exhibit light having a wavelength of about 620 nm (nanometer, one billionth of a meter) to 750 nm, green light may exhibit light having a wavelength of about 495 nm to 570 nm, and blue light may exhibit light having a wavelength of about 450 nm to 495 nm.

By a combination of red light of the red subpixel, green light of the green subpixel and blue light of the blue subpixel, each of the plurality of pixels may emit light having various levels of brightness and various colors.

FIG. 1 illustrates that the screen 20 is formed in a flat plate shape, but the shape of the screen 20 is not limited to that illustrated in FIG. 1. For example, according to the shape of the main body 10, the screen 20 may have a shape in which both right and left ends protrude forward and the center thereof is concave.

An antenna cover 80 provided to cover a portion corresponding to an antenna 100, which will be described later, may be coupled to an upper surface of the main body 10. The position of the antenna cover 80 is not limited thereto, but the antenna cover 80 may be coupled to a left surface of the main body 10 when the antenna 100 is provided on the left surface of the main body 10 and may be coupled to a right surface of the main body 10 when the antenna 100 is provided on the right surface of the main body 10.

The support 90 is installed below the main body 10 such that the main body 10 may maintain a stable posture on a floor surface. Alternatively, the support 90 may be installed on a rear surface of the main body 10 such that the main body 10 may be securely fixed to a wall surface.

The input device 3 may be configured to allow a user to input a desired command into the display apparatus 1.

As illustrated in FIG. 2, various components for generating an image on the screen 20 may be provided inside the main body 10.

For example, the main body 10 is provided with a backlight unit 22 configured to emit surface light forward, a display panel 21 configured to block or transmit light emitted from the backlight unit 22, and a power supply/control unit 30 configured to control the operation of the backlight unit 22 and the display panel 21. Also, the main body 10 may be provided with a case 11 configured to support and fix the display panel 21, the backlight unit 22 and the power supply/control unit 30. The case 11 may include a bezel 12, a frame middle mold 13, a bottom chassis 14, and a rear cover 15. The display panel 21 may be mounted on the case 11.

The bezel 12 may be disposed to cover a circumference of the display panel 21. The bezel 12 may have a width in a front-rear direction of about 1.5 cm. The bezel 12 may include metal. The bezel 12 may include a bezel surface 12a formed at a boundary of the display panel 21. The bezel surface 12a may include an upper surface, a lower surface, a left surface, and a right surface of the bezel 12.

The bottom chassis 14 may be disposed to cover the rear of the display panel 21. The bottom chassis 14 may be grounded with the antenna 100 to serve as ground. To this end, the bottom chassis 14 may include metal.

The backlight unit 22 may include a point light source emitting monochromatic light or white light and may refract, reflect, and scatter light to convert light emitted from the point light source into uniform surface light.

For example, the backlight unit 22 may include a light source emitting monochromatic light or white light, a light guide plate through which light is incident from the light source and the incident light is diffused, a reflective sheet reflecting the light emitted from a rear surface of the light guide plate, and an optical sheet refracting and scattering light emitted from a front surface of the light guide plate.

As such, the backlight unit 22 may emit uniform surface light toward the front by refracting, reflecting, and scattering light emitted from the light source.

The display panel 21 is provided in the front of the backlight unit 22 and blocks or transmits light emitted from the backlight unit 22 to form an image.

A front surface of the display panel 21 forms the screen 20 of the display apparatus 1 described above may be composed of the plurality of pixels. The plurality of pixels included in the display panel 21 may independently block or transmit light from the backlight unit 22, and light transmitted by the plurality of pixels may form an image displayed on the display apparatus 1.

The power supply/control unit 30 may include a power supply circuit supplying power to the backlight unit 22 and the display panel 21, and a control circuit controlling the operation of the backlight unit 22 and the display panel 21.

The power supply circuit may supply power to the backlight unit 22 such that the backlight unit 22 may emit surface light and may supply power to the display panel 21 such that the display panel 21 may transmit or block light.

The control circuit may control the backlight unit 22 to adjust the intensity of light emitted by the backlight unit 22 and may control the display panel 21 to display an image on the screen 20.

For example, the control circuit may control the display panel 21 to display an image by a video signal received from content sources. Each of the plurality of pixels included in the display panel 21 transmits or blocks light according to image data of the control circuit, and as a result, an image is displayed on the screen 20.

The power supply/control unit 30 may be implemented with a printed circuit board and various circuits mounted on the printed circuit board. For example, the power supply circuit may include a capacitor, a coil, a resistance element, a microprocessor, and the like, and a power supply circuit board on which these components are mounted. The control circuit may include a memory, a microprocessor and a control circuit board on which these components are mounted.

A cable 21a transmitting image data from the power supply/control unit 30 to the display panel 21 and a display driver integrated circuit (DDI) 21b (hereinafter referred to as a 'display drive unit') processing the image data are provided between the display panel 21 and the power supply/control unit 30.

The cable 21a may electrically connect the power supply/control unit 30 and the display drive unit 21b and may electrically connect the display drive unit 21b and the display panel 21.

The display drive unit 21b may receive image data from the power supply/control unit 30 through the cable 21a and may transmit the image data to the display panel 21 through the cable 21a.

The cable 21a may be implemented as a film cable that may be bent by an external force, and the cable 21a and the display drive unit 21b may be integrally implemented by a film cable, a chip on film (COF), a tape carrier packet (TCP), and the like. In other words, the display drive unit 21b may be disposed on the cable 21a. However, the present disclosure is not limited thereto, and the display drive unit 21b may be disposed on the display panel 21.

Figure 3:
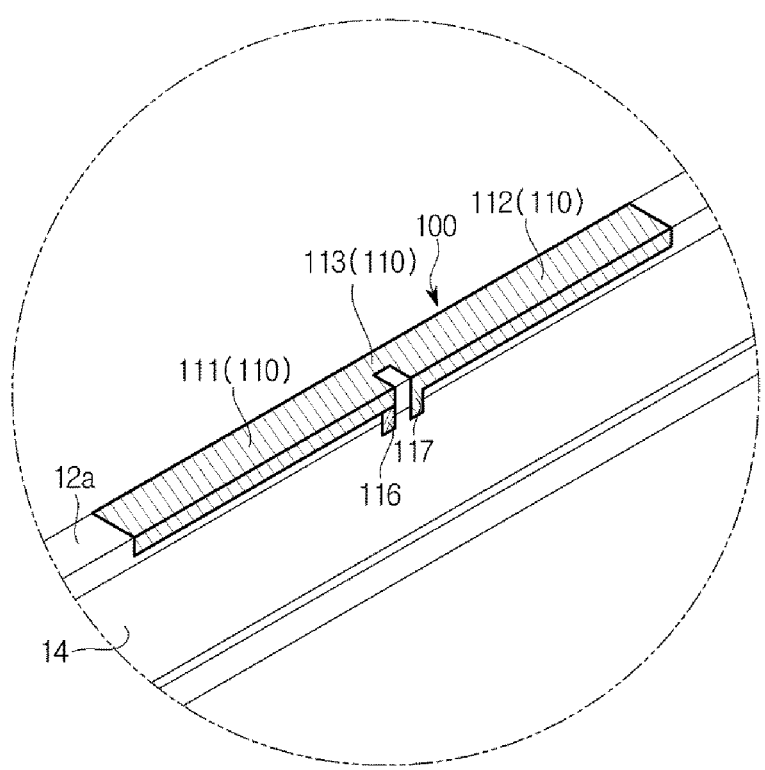
FIG. 3 is a rear view of an antenna formed integrally with a bezel illustrated in FIG. 2.
Figure 4:
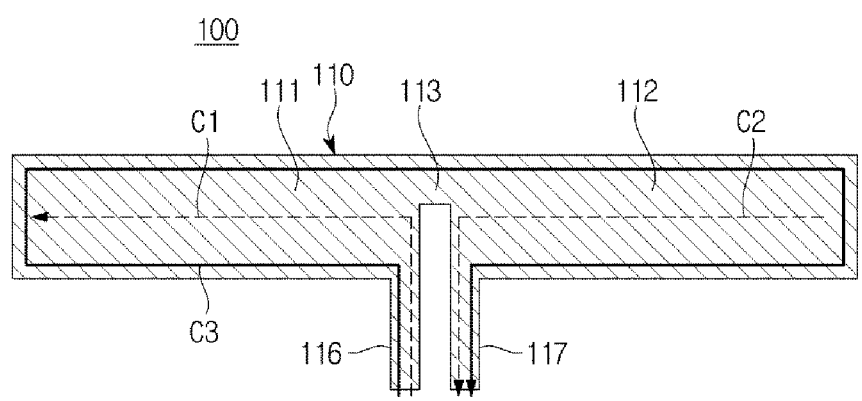
FIG. 4 schematically illustrates a flow of current in the antenna illustrated in FIG. 3.
Figure 5:
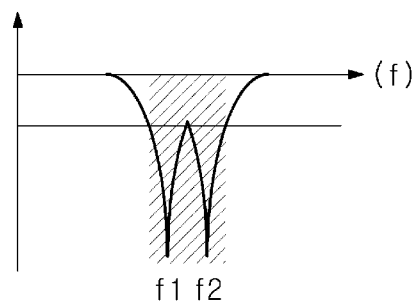
FIG. 5 is a graph schematically illustrating a band of a resonant frequency at which the antenna illustrated in FIG. 3 operates.

FIG. 3 is a rear view of an antenna formed integrally with a bezel illustrated in FIG. 2. FIG. 4 schematically illustrates a flow of current in the antenna illustrated in FIG. 3. FIG. 5 is a graph schematically illustrating a band of a resonant frequency at which the antenna illustrated in FIG. 3 operates. The antenna cover 80 and the rear cover 15 are not shown in FIG. 3.

Referring to FIGS. 3 to 5, the antenna 100 may be integrally formed on a circumferential surface of the bezel 12. The antenna 100 may integrally form a pattern thereof on the circumferential surface of the bezel 12. Alternatively, the antenna 100 may be detachably mounted on the bezel 12. The antenna 100 may include metal. The antenna 100 may be formed in a flat plate shape. The antenna 100 may be located on the bezel surface 12a. Specifically, the antenna 100 may be integrally formed on the upper surface of the bezel 12. Alternatively, the antenna 100 may be integrally formed on a left surface and/or a right side surface of the bezel 12.

The antenna 100 may include an antenna body 110, a power supply portion 116 extending from the antenna body 110, and a ground portion 117.

The antenna body 110 may extend in a planar shape on the upper surface of the bezel 12. The antenna body 110 may extend in a horizontal direction to the bezel surface 12a. The antenna body 110 may be provided to be disposed on the same surface as the upper surface of the bezel 12. That is, the antenna 100 is provided to be formed integrally with the bezel 12 and to be disposed on the same flat surface as the bezel 12, and a portion protruding due to the antenna 100 is not formed on the upper surface of the bezel 12. Therefore, a design of the display apparatus 1 may be improved. A portion of the antenna body 110 may be bent along the rear surface of the bezel 12.

The antenna body 110 may include a first body 111 extending in a first direction along a circumference of the bezel 12, a second body 112 extending in a second direction opposite to the first direction along the circumference of the bezel 12, and a connection body 113 connecting the first body 111 and the second body 112. The connection body 113 may be provided to have a width smaller than that of the first body 111 and/or the second body 112.

A size of the antenna body 110 may be determined according to a signal to be received. Specifically, lengths of the first body 111 and the second body 112 of the antenna 100 according to the above-described configuration may be formed relatively long when a resonant frequency is to be reduced. On the other hand, the lengths of the first body 111 and the second body 112 may be formed relatively short when the resonant frequency is to be increased.

Also, when the width of the connection body 113 is relatively short, the connection body 113 becomes a shape similar to that of a dipole antenna, so that the resonant frequency becomes relatively low. On the other hand, when the width of the connection body 113 is relatively long, the connection body 113 becomes a shape similar to that of a loop antenna, so that the resonant frequency becomes relatively high.

The antenna 100 may include the power supply portion 116 extending from one portion of the antenna body 110 and the ground portion 117 extending from the other portion of the antenna body 110.

The power supply portion 116 may extend from the rear of the antenna body 110 in a downward direction. As power is supplied to the power supply portion 116, the antenna 100 may receive an external signal.

The ground portion 117 may extend from the rear of the antenna body 110 in the downward direction to be connected to the bottom chassis 14. The bottom chassis 14 including metal may serve as a ground. According to this configuration, the antenna 100 may form a closed circuit.

Referring to FIGS. 4 and 5, according to this configuration, the antenna 100 according to an embodiment of the present disclosure may have a first resonant frequency f1 formed by a first current C1 flowing in the first direction along the first body 111 and a second current C2 flowing in the second direction along the second body 112, and a second resonant frequency f2 formed by a third current C3 sequentially flowing through the first body 111, the connection body 113, and the second body 112, and the second resonant frequency f2 may be different from the first resonant frequency f1.

Specifically, referring to FIG. 5, as described above, the antenna 100 according to an embodiment of the present disclosure may have both a characteristic of a dipole antenna and a characteristic of a loop antenna. That is, the antenna 100 according to an embodiment of the present disclosure may operate at the first resonant frequency f1, which is a relatively low resonant frequency, according to the characteristic of the dipole antenna, and the second resonant frequency f2, which is a relatively high resonant frequency, according to the characteristic of the loop antenna. Accordingly, the antenna 100 according to an embodiment of the present disclosure may receive a broadband signal compared to a general antenna.

According to this configuration, the display apparatus 1 according to an embodiment of the present disclosure may receive a broadband signal through the antenna 100 integrally formed with the bezel 12 without a separate external device.

Figure 6:
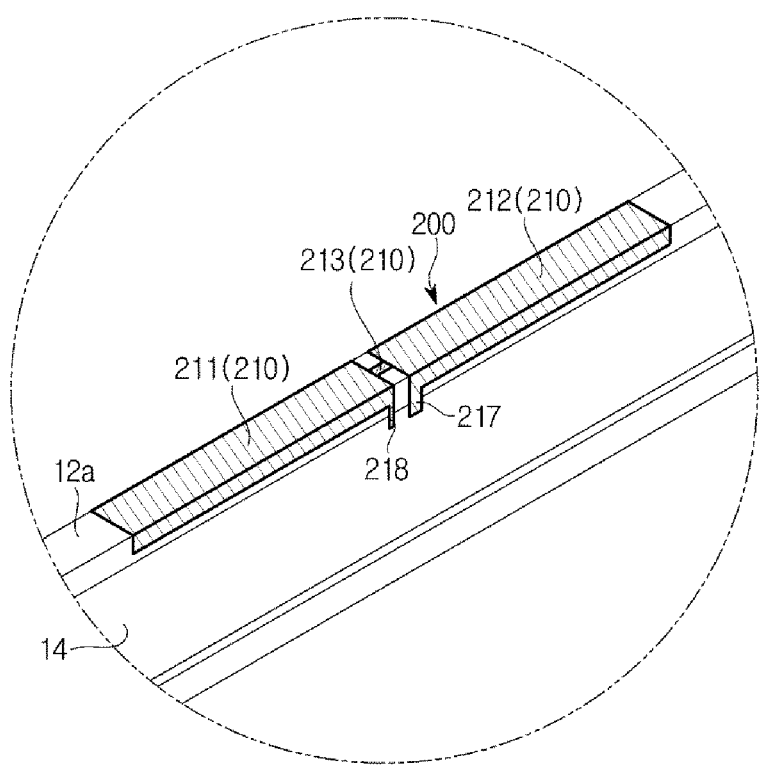
FIG. 6 is a rear view of an antenna according to another embodiment of the present disclosure.

FIG. 6 is a rear view of an antenna according to another embodiment of the present disclosure.

An antenna 200 according to another embodiment of the present disclosure will be described with reference to FIG. 6. The same reference numerals may be assigned to the same configurations as those of the above-described embodiment, and description thereof may be omitted.

Referring to FIG. 6, unlike in the above-described embodiment, in the antenna 200 according to another embodiment of the present disclosure, a connection body 213 may be provided as a power supply portion. The antenna 200 may be located on the bezel surface 12a.

Specifically, an antenna body 210 of the antenna 200 may include a first body 211 extending in the first direction along the circumference of the bezel 12, a second body 212 extending in the second direction opposite to the first direction along the circumference of the bezel 12, and the connection body 213 connecting the first body 211 and the second body 212. The connection body 213 may be provided to have a width smaller than those of the first body 211 and the second body 212.

The connection body 213 may include a power supply portion to which power is supplied. Accordingly, the antenna 200 may include a first ground portion 218 extending from one portion of the antenna body 210 and a second ground portion 217 extending from the other portion of the antenna body 210. Specifically, the first ground portion 218 may extend from the first body 211, and the second ground portion 217 may extend from the second body 212. The first ground portion 218 and the second ground portion 217 may be grounded to the bottom chassis 14, respectively. The first ground portion 218 and the second ground portion 217 may have different sizes.

Figure 7:
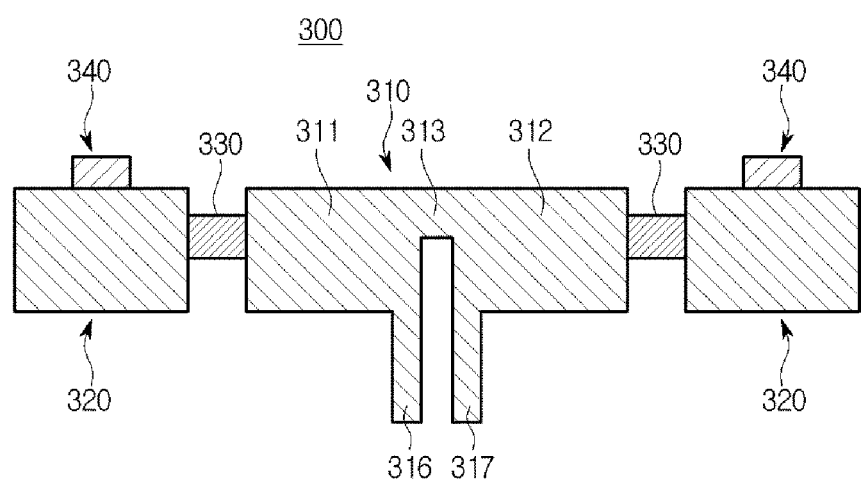
FIG. 7 schematically illustrates an antenna according to another embodiment of the present disclosure.
Figure 8:
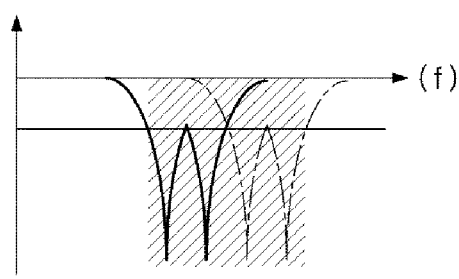
FIG. 8 is a graph schematically illustrating a band of a resonant frequency at which the antenna operates when a frequency variable device illustrated in FIG. 7 is a pin diode.
Figure 9:
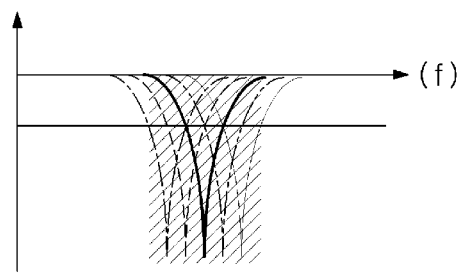
FIG. 9 is a graph schematically illustrating a band of a resonant frequency at which the antenna operates when the frequency variable device illustrated in FIG. 7 is a varactor diode.

FIG. 7 schematically illustrates an antenna according to another embodiment of the present disclosure. FIG. 8 is a graph schematically illustrating a band of a resonant frequency at which the antenna operates when a frequency variable device illustrated in FIG. 7 is a pin diode. FIG. 9 is a graph schematically illustrating a band of a resonant frequency at which the antenna operates when the frequency variable device illustrated in FIG. 7 is a varactor diode.

An antenna 300 according to another embodiment of the present disclosure will be described with reference to FIG. 7. The same reference numerals may be assigned to the same configurations as those of the above-described embodiment, and description thereof may be omitted.

Referring to FIG. 7, the antenna 300 may include an antenna body 310 extending in a planar shape on a circumferential surface of a bezel 120, an extension body 320 provided on opposite sides of the antenna body 310 along a circumferential direction of the bezel 120, a frequency variable device 330 configured to selectively electrically connect the antenna body 310 and the extension body 320, a power supply portion 316, and a ground portion 317.

The antenna body 310 may include a first body 311, a second body 312, and a connection body 313. Power may be supplied to the antenna 300 through the power supply portion 316. The ground portion 317 may be grounded to the bottom chassis 14.

The extension body 320 may be formed by patterning the bezel 12 on the opposite sides of the antenna body 310 along the circumferential direction of the bezel 12. When the extension body 320 is electrically connected to the antenna body 310 by the frequency variable device 330, current may flow therein.

The frequency variable device 330 may be configured to electrically connect the antenna body 310 and the connection body 320 and selectively connect the antenna body 310 and the connection body 320. The frequency variable device 330 may be configured to change a resonant frequency of the antenna 300. The bezel 120 may include a groove (not shown) formed to allow the frequency variable device 300 to be inserted so that the frequency variable device 300 is disposed on the same surface as the circumferential surface of the bezel 120.

The frequency variable device 330 may include a pin diode configured to electrically connect the antenna body 310 and the extension body 320 as power is supplied.

Specifically, as illustrated in FIG. 8, when power supplied to the pin diode is cut off, the antenna 300 may operate in a first resonant frequency band generated by a current flowing only inside the antenna body 310, and when power is supplied to the pin diode, the antenna 300 may operate in a second resonant frequency band generated by a current flowing inside the antenna body 310 and the extension body 320.

That is, because a length of the antenna 300 becomes long when power is supplied to the pin diode and the antenna body 310 and the extension body 320 are electrically connected, the antenna 300 may be operated at the relatively low second resonant frequency, and because the length of the antenna 300 becomes short when the power supplied to the pin diode is cut off and the antenna body 310 and the extension body 320 are electrically separated, the antenna 300 may be operated at the relatively high first resonant frequency.

According to this configuration, the antenna 300 may receive a signal in a frequency band of approximately 450 MHz or more and 770 MHz or less.

The frequency variable device 330 may include a varactor diode configured to adjust the degree of electrical connection between the antenna body 310 and the extension body 320.

Specifically, as illustrated in FIG. 9, when power supplied to the varactor diode increases, a value of a capacity C of the varactor diode decreases so that the resonant frequency at which the antenna 300 is operated may increase. On the other hand, when power supplied to the varactor diode decreases, a value of the capacity C of the varactor diode increases so that the resonant frequency at which the antenna 300 is operated may decrease.

When the frequency variable device 330 is provided as a varactor diode, the resonant frequency is continuously changed compared to a case of being provided as a pin diode, so that a signal may be more accurately received. That is, when the frequency variable device 330 is provided as a varactor diode, the frequency variable device 330 may have optimal operating characteristics in all frequency bands.

An inductor 340 may be disposed on the extension body 320. The inductor 340 may block power noise from the outside.

According to this configuration, the antenna 300 according to an embodiment of the present disclosure may operate in the entire frequencies of an ultra-high (UHF) broadcast band by appropriately adjusting the frequency variable device 330.

Figure 10:
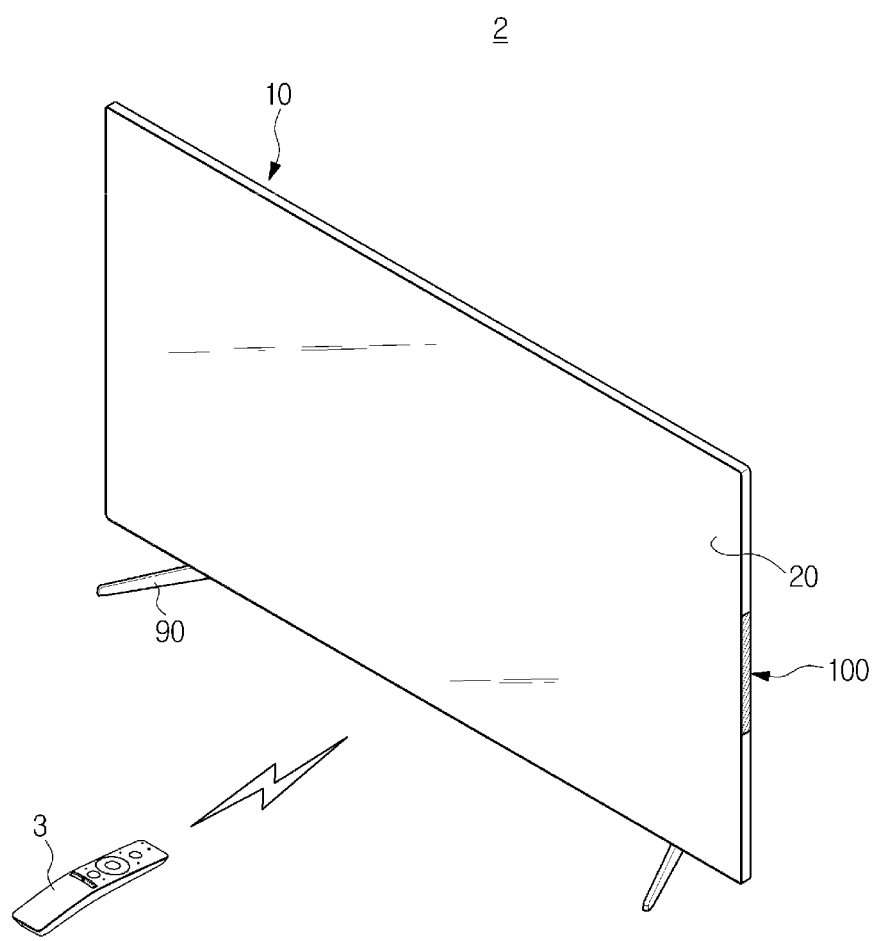
FIG. 10 illustrates an outer appearance of a display apparatus according to another embodiment of the present disclosure.

FIG. 10 illustrates an outer appearance of a display apparatus according to another embodiment of the present disclosure.

A display apparatus 2 according to another embodiment of the present disclosure will be described with reference to FIG. 10. The same reference numerals may be assigned to the same configurations as those of the above-described embodiment, and description thereof may be omitted.

The display apparatus 2 may include the antenna 100 configured to operate in the entire frequencies of the UHF broadcast band. The antenna 100 may have the same configuration as the antenna 100 illustrated in FIGS. 3 to 5. The antenna 100 may have the same configuration as the antenna 100 illustrated in FIGS. 6 and 7.

The antenna 100 may be disposed on one side surface of the main body 10 of the display apparatus 2. FIG. 10 illustrates that the antenna 100 is disposed on the right surface of the main body 10, but unlike this, the antenna 100 may be disposed on the left surface of the main body 10 or may be disposed on both the left surface and right surface of the main body 10.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
a display panel;
a bezel surface formed on a boundary of the display panel; and
an antenna located on the bezel surface, wherein the antenna comprises:
an antenna body extending in a horizontal direction to the bezel surface;
an extension body provided on one side or opposite sides of the antenna body; and
a frequency variable device configured to selectively electrically connect the antenna body and the extension body,
wherein the antenna body comprises:
a first body extending in a first direction along the bezel surface;
a second body extending along the bezel surface in a second direction opposite to the first direction; and
a connection body connecting the first body and the second body, and wherein a width of the connection body is smaller than a width of the first body or the second body.

2. The display apparatus according to claim 1, wherein the frequency variable device comprises a pin diode configured to electrically connect the antenna body and the extension body as power is supplied.

3. The display apparatus according to claim 2, wherein the antenna is configured to operate at a first frequency when power supplied to the pin diode is cut off, and
wherein the antenna is configured to operate at a second frequency lower than the first frequency when power is supplied to the pin diode.

4. The display apparatus according to claim 1, wherein the frequency variable device comprises a varactor diode configured to adjust a degree of electrical connection between the antenna body and the extension body.

5. The display apparatus according to claim 4, wherein an operating frequency of the antenna is configured to gradually increase as power supplied to the varactor diode increases.

6. The display apparatus according to claim 1, further comprising
a bottom chassis configured to cover the rear of the display panel,
wherein the antenna comprises a power supply portion extending from one portion of the antenna body, and a ground portion extending from the other portion of the antenna body and connected to the bottom chassis.

7. The display apparatus according to claim 6, wherein the bottom chassis comprises metal.

8. The display apparatus according to claim 1, wherein the connection body comprises a power supply portion to which current is applied, and
the antenna body comprises a first ground portion extending from the first body and a second ground portion extending from the second body.

9. The display apparatus according to claim 1, wherein the antenna body is configured to have:
a first resonant frequency formed by a first current flowing in the first direction along the first body and a second current flowing in the second direction along the second body; and
a second resonant frequency formed by a third current sequentially flowing through the first body, the connection body, and the second body, wherein the second resonant frequency is different from the first resonant frequency.

10. The display apparatus according to claim 1, wherein the antenna comprises an inductor disposed on the extension body.

11. The display apparatus according to claim 1, wherein the antenna is formed on at least one of an upper surface, a left surface, and a right surface of the bezel surface.

12. The display apparatus according to claim 1, wherein the antenna body is disposed on the same surface as the bezel surface.

* * * * *